(12) United States Patent
Schmaelzle et al.

(10) Patent No.: US 9,110,354 B2
(45) Date of Patent: Aug. 18, 2015

(54) STEERABLE ILLUMINATION SOURCE FOR A COMPACT CAMERA

(71) Applicant: Palo Alto Research Center Incorporated, Palo Alto, CA (US)

(72) Inventors: Philipp Helmut Schmaelzle, Los Altos, CA (US); Dirk De Bruyker, San Jose, CA (US); Timothy Stowe, Alameda, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/623,786

(22) Filed: Sep. 20, 2012

(65) Prior Publication Data

US 2014/0078383 A1 Mar. 20, 2014

(51) Int. Cl.
*G03B 15/02* (2006.01)
*G03B 15/03* (2006.01)
*G02B 26/08* (2006.01)
*H04M 1/22* (2006.01)

(52) U.S. Cl.
CPC ............... *G03B 15/02* (2013.01); *G03B 15/03* (2013.01); *G02B 26/085* (2013.01); *G02B 26/0841* (2013.01); *G03B 2215/0528* (2013.01); *G03B 2215/0585* (2013.01); *H04M 1/22* (2013.01)

(58) Field of Classification Search
CPC ............ G02B 26/085; G02B 26/0841; G03B 2215/0585; G03B 2215/0528; G03B 15/03; G03B 15/02; G03B 15/05; G03B 9/70; G03B 7/16; H04M 1/22; H04M 1/32; H04M 1/72577; H04M 2250/12; H04M 2250/22; H04N 5/2256; H04N 5/2354; H04N 5/2257

USPC .......... 348/370–371; 362/3–18, 227–249.19, 362/253, 254, 255, 256, 257–311.15, 362/317–375
See application file for complete search history.

(56) References Cited

U.S. PATENT DOCUMENTS

| 6,267,605 | B1 | 7/2001 | Biegelsen |
| 6,411,427 | B1 | 6/2002 | Peeters et al. |
| 7,354,167 | B2 * | 4/2008 | Cho et al. ...................... 359/850 |

(Continued)

OTHER PUBLICATIONS

Humpries, "Apple files patent for directional camera flash", http://www.geek.com/articles/mobile/apple-files-patent-for-directional-camera-flash-20100927/, Sep. 27, 2010 (Geek.com).

(Continued)

*Primary Examiner* — Pritham Prabhakher
(74) *Attorney, Agent, or Firm* — Hollingsworth Davis, LLC

(57) ABSTRACT

A subsystem is disclosed providing a steerable-beam light source. An array of micromechanical reflectors may be disposed to selectively direct portions of light from a light source to selected targets in a scene, such as for providing composed illumination for still or video photography. The array of reflectors may be continuously steerable, thereby achieving more than the mere inefficient patterning of illumination light available from prior art projection approaches, but instead efficiently redirecting light to the desired regions of the scene. The subsystem may be sufficiently compact so as to permit integration with a compact camera into a cellular telephone, a tablet computer, a laptop computer, a digital still-image camera, a digital video-image camera, and so on. The array may be operated in conjunction with a camera controller to selectively illuminate one or more targets of focus or zoom, omit illumination of undesirable image regions, etc.

23 Claims, 15 Drawing Sheets

(56) References Cited

U.S. PATENT DOCUMENTS

| | | |
|---|---|---|
| 8,154,650 B2 | 4/2012 | Tsai |
| 8,350,990 B2 * | 1/2013 | Fuchikami et al. ............. 349/67 |
| 2003/0011700 A1 * | 1/2003 | Bean et al. .................... 348/345 |
| 2005/0264867 A1 * | 12/2005 | Cho et al. ...................... 359/291 |
| 2008/0316373 A1 * | 12/2008 | Hishida ......................... 348/744 |
| 2010/0110311 A1 * | 5/2010 | Sade et al. .................... 348/750 |
| 2010/0208163 A1 * | 8/2010 | Fuchikami et al. ............. 349/62 |
| 2010/0238344 A1 * | 9/2010 | Tsai .............................. 348/361 |
| 2011/0310372 A1 * | 12/2011 | Claessens et al. ............. 355/67 |
| 2011/0315772 A1 * | 12/2011 | Shi ........................... 235/462.25 |
| 2012/0121244 A1 * | 5/2012 | Stavely ......................... 396/175 |
| 2014/0022414 A1 * | 1/2014 | Bhatia et al. .................. 348/239 |

OTHER PUBLICATIONS

Unknown, "Apple Working on the Next Wave of Digital Camera Technologies", http://www.patentlyapple.com/patently-apple/2010/09/apple-working-on-the-next-wave-of-digital-camera-technologies.html, Sep. 23, 2010, (patentlyapple.com).

* cited by examiner

STEERABLE ILLUMINATION SOURCE FOR A COMPACT CAMERA

BACKGROUND

The present disclosure is related to illumination sources for portable devices, and more particularly to sources with directable illumination fields.

Modern electronics design and manufacturing has made it possible to provide compact cameras that autonomously handle all aspects of settings and adjustments required to capture properly exposed, properly framed, and properly focused images. Compact digital cameras, point-and-shoot digital cameras, and cell phone and tablet computer cameras (collectively referred to herein as compact cameras) are examples of devices that provide such autonomous settings control. More specifically, such cameras are able to autonomously set aperture opening size (e.g., f-number), aperture opening duration, account for sensor gain (roughly equivalent to ISO film sensitivity), and so on. Such cameras may also identify an image target object in a field of view, and set focus for that target. In general, compact cameras are often intended to provide simple operation for rapid, spontaneous picture taking, and are expected to perform in a wide range of photographic situations, while increases in processing power and software enable the cameras to "understand" more of a scene.

Among the set of situations compact cameras are often designed to perform in are low-light settings, for example indoors, in evening settings, and so on. Usage patterns are predominantly handheld (no tripod) and show an emphasis on snapshots of people. Even with highly sensitive electronic sensors taking the place of film, such settings necessitate using a supplemental light source (referred to as a flash herein) for example to freeze a target and avoid motion blur, to provide desired contrast, and so on. Most compact cameras therefore contain or are provided with a flash unit.

However, to be of use in the widest set of situations (including indoor settings), compact cameras are often designed to provide a relatively wide field of view (with consequent short effective focal length). To accommodate the relatively wide field of view in low-light settings, flash units (often an LED source and today some plastic optics to define its light distribution) for compact cameras are typically designed to illuminate a corresponding wide field of view (wide view angle). Consequently, compact camera flash units illuminates the entire wide angle scene, regardless of the target of the exposure, and even if the camera is zoomed in for a telephoto image. This not only wastes precious energy on generating sufficient light to illuminate the widest possible field of view, but also often results in lower light levels at specific portions of the image frame as well as over-lighting of non-target elements of the image frame. As an example, if a shot is taken at 3× zoom, more than 85% of the flash output will typically go unused. A more efficient use of a light source in compact cameras would provide many benefits, including improved illumination of image target, reduced power consumption, faster image repetition rates, and so on.

While typical compact camera flash sources are fixed in position, with fixed associated optics, some examples exist of flash source with lenses that move in tandem with motion of mechanically controlled zoom and focus imaging optics. In certain applications, these lenses "focus" the output of the flash within the field of the flash exposure. In other examples, an evaluator evaluates a scene to determine an intended image target of the photograph. A lens is then mechanically moved to direct the output of a flash element to the intended image target. Alternatively, the flash element may be tilted relative to the lens to achieve a similar objective. In each of these cases, the "compactness" of the flash system is compromised by the introduction of one or more moveable lenses and lens movement control mechanisms. And only gross position control of the light source (i.e., only control over the entire output of the source) is provided.

SUMMARY

Accordingly, the present disclosure is directed to systems and processes for providing controllable, steerable flash lighting for compact cameras and other devices requiring object illumination. In certain embodiments of the present disclosure, a light source is directed to compact steerable reflective or transmissive array, which can aim individual light beams, originating from a single light source, to or away from desired elements in a scene to be photographed. The steerable reflective or transmissive array may comprise, in certain implementations, a micro-electro-mechanical (MEMS) mirror or lens array structure of a type providing individual control over the orientations and/or positions of the array element, thereby providing individual control over the light beams reflected or transmitted by the respective array elements.

According to one aspect of the disclosure a subsystem is disclosed providing a steerable-beam light source. The light source comprises an optically transparent substrate, a light source disposed for directing light generated thereby into the optically transparent substrate, and an array comprising a plurality of independently addressable optical elements disposed such that light from the light source received through the transparent substrate is incident upon the array, each of the independently addressable optical elements being capable of independently redirecting a portion of the light from the light source into a desired light path.

According to another aspect of the present disclosure, the optical elements may be reflective, or with the addition of a reflective structure, each of the optical elements may be transmissive (e.g., lenses).

According to yet another aspect of the present disclosure, the array may be operated in conjunction with a camera controller to selectively concentrate the illumination on one or more targets identified by the camera, or inside the field of view at the camera's current zoom setting.

The array comprises a plurality of rows, and each row comprises a plurality of optical elements. A first of the rows has a first number of optical elements and a second of the rows has a second number of optical elements. While in certain embodiments a regular array can be used, according to another aspect of the present disclosure, the first number and the second number are different. According to another aspect of the present disclosure, the dimensions of optical elements in the first row are different than the dimensions of the optical elements in the second row. According to a further aspect of the present disclosure, the shapes of optical elements in the first row are different than the shapes of the optical elements in the second row. According to a still further aspect of the present disclosure, the array itself has other than a rectangular array shape.

The above is a brief summary of a number of unique aspects, features, and advantages of the present disclosure. The above summary is provided to introduce the context and certain concepts relevant to the full description that follows. However, this summary is not exhaustive. The above summary is not intended to be nor should it be read as an exclusive identification of aspects, features, or advantages of the claimed subject matter. Therefore, the above summary should not be read as imparting limitations to the claims nor in any other way determining the scope of said claims.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details.

Figure 1A:
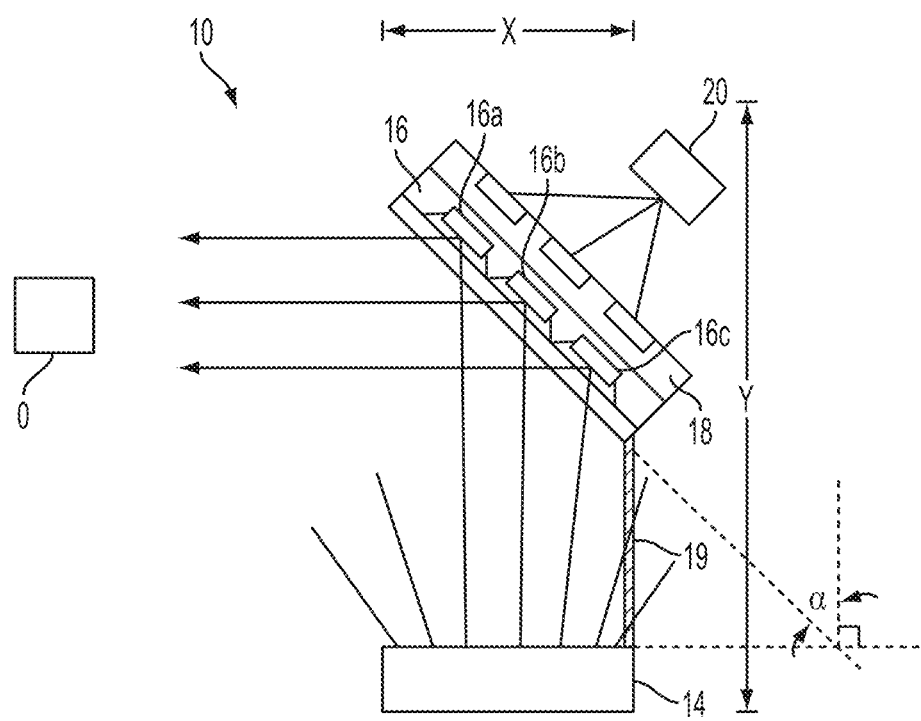
FIGS. 1A, 1B, and 1C are sectional views of a reflective steerable illumination structure such as may be used in a compact camera flash device and the like according to an embodiment of the present disclosure.
Figure 1B:
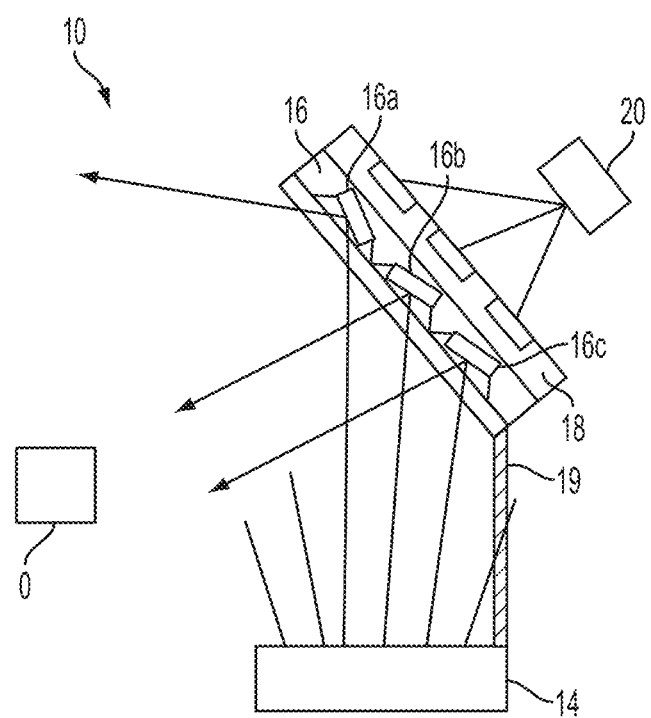
Figure 1C:
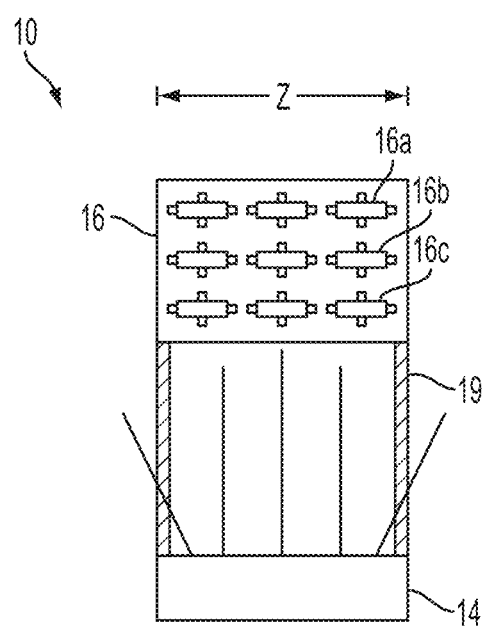

A first implementation of the present disclosure is illustrated in FIGS. 1A through 1C. With reference to FIG. 1A, a steerable illumination structure 10, such as may be used in a compact camera flash device and the like is shown. Structure 10 comprises a light source 14 such as an LED element, array of LED elements, single element bulb (e.g., xenon flash lamp), or another of a variety of known forms of light source. In certain examples, multiple different light sources may be employed. However, the LED array implementation has characteristics such as size, power consumption, flash speed, and so on that lend itself well to flash units employed in mobile devices such as telephones, and so this implementation will be described here by way of example.

Disposed opposite light source 14 is a micro-electro-mechanical (MEMS) mirror array 16 of a type discussed in further detail below. Disposed proximate MEMS mirror array 16 is an actuation array 18 capable of actuating the mirrors of MEMS mirror array 16. Actuation array 18 may actuate individual mirrors of MEMS mirror array 16 or may actuate groups of mirrors of MEMS mirror array 16, and may be controlled by a controller 20. In various embodiments, actuator array 18 may operate to actuate elements of array 16 by magnetic, electrostatic, thermal, piezoelectric, shape memory effect, or other form of actuation.

In operation, light source 14 produces light, in one embodiment as a discrete burst or flash of light, and in another embodiment as a steady beam. Light from source 14 is incident on mirrors 16a, 16b, and 16c. While a three by three array of mirrors is shown in the view of FIGS. 1A, 1B, and 1C, the mirrors being rectilinearly aligned, it will be appreciated that the number of mirrors and arrangement thereof is relatively arbitrary, and may therefore vary in different configurations depending on design choice, application, and so on.

The disposition of mirrors 16a, 16b, 16c, and the angle α between the mirror plane and the beam path permits light from source 14 to be reflected by mirrors 16a, 16b, 16c toward a target image O. A frame 19 may secure light source 14 to array 16 to maintain a as a constant. The rotation angle of mirrors 16a, 16b, and 16c are, in the present embodiment, individually adjustable in two dimensions by actuation array 18 (although they may similarly be adjustable in only one dimension, adjustable as groups, and so on). Thus, the orientation of mirrors 16a, 16b, 16c will determine aspects of the reflected light, such as the amount of light and where the light is directed. For example, with mirrors 16a, 16b, 16c aligned in a first state, the beams of light from source 14 may be effectively collimated and/or directed toward a single image target, O, essentially as shown in FIG. 1A. Likewise, with mirrors 16a, 16b, 16c aligned in a second state, the beams of light from source 14 may be reflected such that only certain beams are directed to image target, O, while certain other beams are directed away from the image target O, as illustrated in FIG. 1B. With reference to FIG. 1C, structure 10 is shown in a view looking toward MEMS mirror array 16.

The implementation illustrated in FIGS. 1A, 1B, and 1C provide a very compact steerable light source such as a steerable flash for photography. For example, given known light sources, MEMS array structures, actuator arrays, and so on, physical dimensions for a complete steerable illumination structure may be on the order of depth (x) up to 5 mm (nominally 3 mm), height (y) up to 10 mm, and width (z) up to 10 mm. Devices at this scale are particularly well suited for integration into compact cameras, mobile telephones, tablet computers, and the like. The final dimensions of such MEMS array structures are a matter of design choice, and therefore do not form a material limitation on the scope of the present disclosure.

It will be further appreciated that while certain embodiments will utilize mirror array 16 to divert a portion of the light from light source 14 to or away from an image target, such as when taking a flash photograph of the target image, the positioning of each of the mirrors comprising array 16 is continuously steerable. That is, the mirrors of array 16 do not provide a binary state of illuminating or non-illuminating, but may direct varying amounts of light from light source 14 toward (or away from) the image target. Therefore, by "continuously steerable" we mean that structure 10 may direct all light from source 14 away from the target image, direct all light from source 14 toward the target image, or direct a selectable portion of the light from source 14 toward the target image.

Figure 2A:
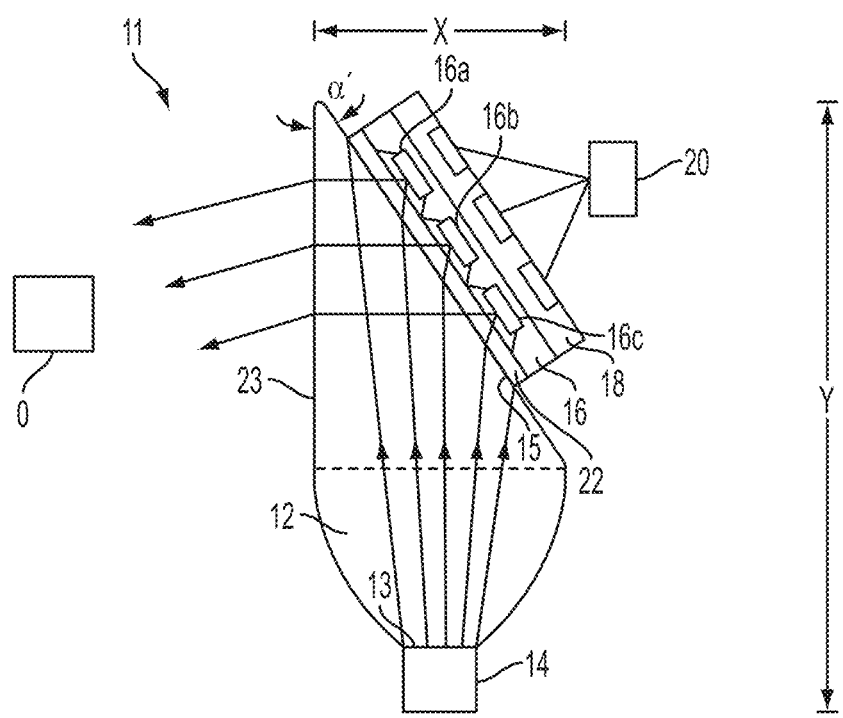
FIGS. 2A, 2B, and 2C are sectional views of a reflective steerable illumination structure such as may be used in a compact camera flash device and the like according to an alternate embodiment of the present disclosure.
Figure 2B:
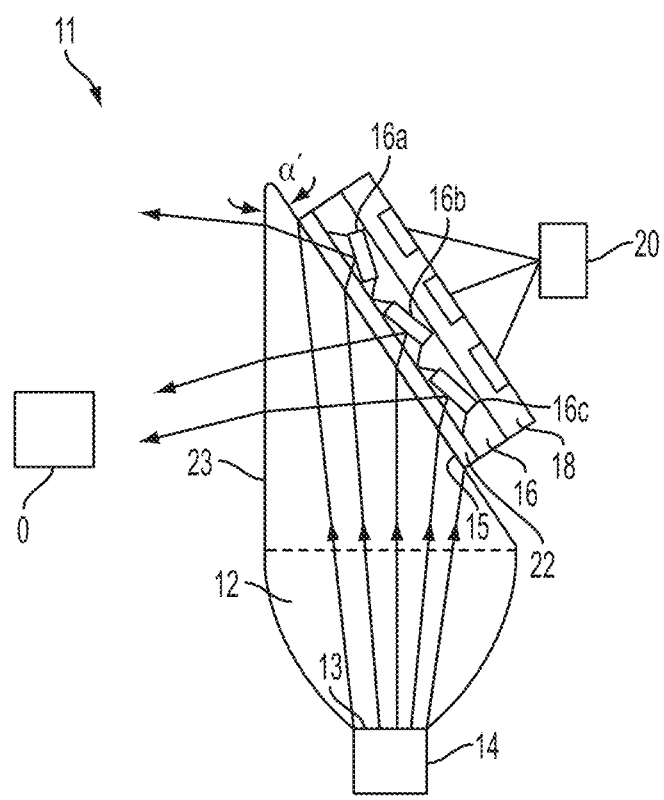
Figure 2C:
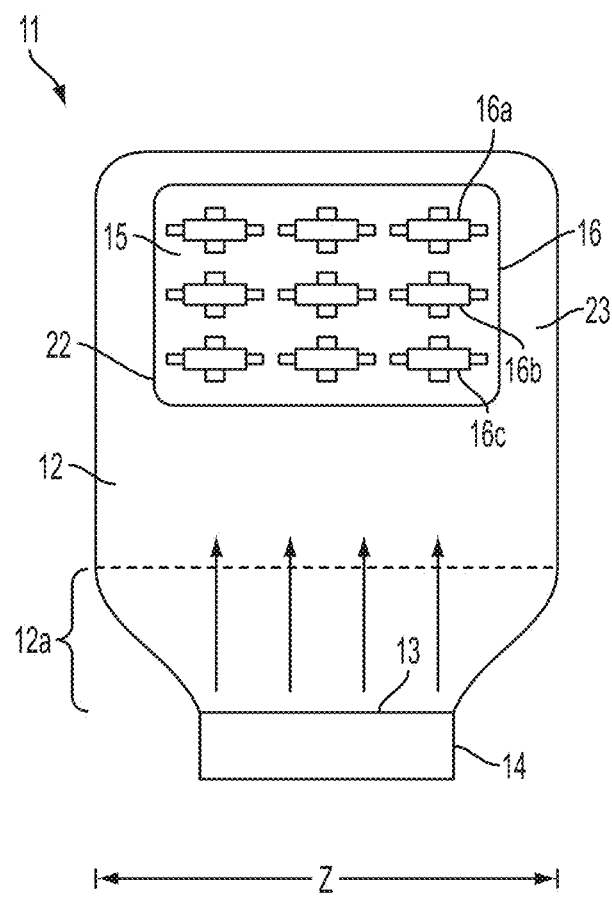

Another implementation of the present disclosure is illustrated in FIGS. 2A, 2B, and 2C. With reference to FIG. 2A, a steerable illumination structure 11, such as may be used in a compact camera flash device and the like is shown. Structure 11 comprises a optical element 12 having a first surface 13 proximate which is disposed light source 14 which, as previously discussed, may be an LED element, array of LED elements, flash lamp, or any other of a variety of known forms of light source. Optical element 12 may (but need not necessarily) provide for total internal reflection (TIR) of light from light source 14 therein. While the functions described in the remainder of this paragraph are realizable with individual components, it is practical to design optical element 12 as a monolithic freeform element (e.g. produced by high quality injection molding) to serve the following purposes simultaneously: A) Collimation and shaping of the light from the light source. B) Providing a TIR surface via which the MEMS mirror array is illuminated. C) Forming the "window" to the world outside the device. D) Serving as the mechanical carrier for the subassembly and providing optional attachment and alignment features to receive the light source 14 (with or without index matching), the micromirror array 16 (with or without index matching), the actuator array 18, electronic modules, etc.

Optical element 12 has a second surface 15 proximate which is disposed MEMS mirror array 16. Disposed proximate MEMS mirror array 16 is actuation array 18 capable of actuating the mirrors of MEMS mirror array 16. Actuation array 18 may actuate individual mirrors of MEMS mirror array 16 or may actuate groups of mirrors of MEMS mirror array 16, and may be controlled by controller 20.

In operation, light source 14 produces light, either as a flash or as a steady beam. Optical element 12 is optically transparent, at least at the wavelengths to be emitted by structure 11. Accordingly, light from source 14 enters optical element 12 at surface 13, travels through optical element 12, and exits at surface 15. An optional substrate 22 may be disposed between surface 15 and MEMS mirror array 16 to provide desired optical wave guiding and attenuate optical loss. If present, light travels through substrate 22 and is incident on mirrors 16a, 16b, and 16c. While a three by three array of mirrors are shown in the view of FIGS. 2A, 2B, and 2C, with rectilinearly aligned mirrors, it will be appreciated that the number of mirrors and arrangement thereof is relatively arbitrary, and may therefore vary in different configurations depending on design choice, application, and so on.

The disposition of mirrors 16a, 16b, 16c, and the angle of surface 15 relative to the plane of surface 13, permits light from source 14 to be reflected by mirrors 16a, 16b, 16c back into optical element 12 toward third surface 23, where the light may exit optical element 12. Surface 15 and surface 23 are oriented at an angle $\alpha'$ relative to one another. Due to the use of optical element 12—and more specifically due to using the same areas of surface 23 both for supplying illuminating light via TIR and for transmitting outgoing light—$\alpha'$ can be much smaller than $\alpha$ (implementation of FIGS. 1A-1C, without optical element 12), creating a thinner form factor, desirable when compact integration is a concern. The orientation of mirrors 16a, 16b, 16c will determine aspects of the light exiting at surface 23, such as the amount of light and where the light is directed. For example, with mirrors 16a, 16b, 16c aligned in a first state, the beams of light from source 14 may be effectively collimated and/or directed toward a single image target, O, essentially as shown in FIG. 2A. Likewise, with mirrors 16a, 16b, 16c aligned in a second state, the beams of light from source 14 may be reflected such that only certain beams are directed to image target, O, while certain other beams are directed away from the image target O, as illustrated in FIG. 2B. With reference to FIG. 2C, structure 11 is shown in a view looking through structure 12 toward MEMS mirror array 16.

While it is not possible to provide a comprehensive list, this capability to selectively direct beams from source 14, or in other words steer portions of light emitted by source 14, provides the ability to:

direct all or some of the light from source 14 to a primary image target when taking a picture, even if the primary image target is not centered in the field of view of the camera allocate or balance illumination of multiple image targets when taking a picture selectively avoid illuminating undesired portions of a scene being photographed (such as regions not in the image frame, reflective surfaces to prevent glare, background objects, objects very close to the camera to prevent overexposure, etc.);

"focus" illumination on one or more desired image target (s) permitting use of less energy on illumination of the image target(s);

automatically track illumination of an image target in tandem with the zoom function of a compact camera;

etc.

Many more capabilities are provided by the methods and apparatus disclosed herein, as will be appreciated when those methods and apparatus are embodied in various implementations. While the present disclosure focuses on compact cameras as an illustrative application for implementations of the present disclosure, many other applications such as vision assistance and direction of other radiation are contemplated hereby, as will be appreciated by one skilled in the relevant art.

Figure 3A:
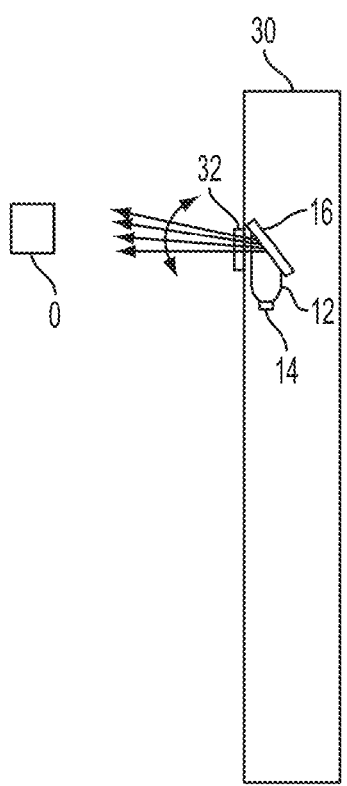
FIGS. 3A and 3B are side views of a compact camera including a compact flash apparatus in first and second operating states according to an embodiment of the present disclosure.
Figure 3B:
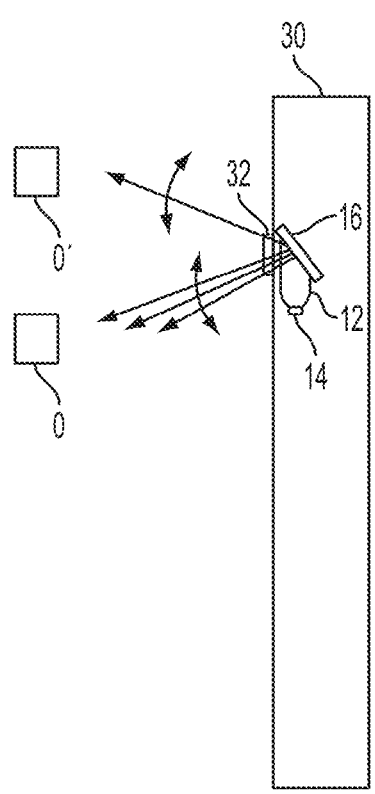

With reference next to FIGS. 3A and 3B, we illustrate the above in the context of a mobile (cellular) telephone 30 in which is disposed structure 10 as previously described. It will be appreciated that the present disclosure is not limited to applications in a cellphone, and that many other applications are contemplated such as a stand-alone flash, a tablet computer, a laptop computer, a digital still-image camera, a digital video-image camera, and other lighting devices, particularly where a burst of light, such as a photographic flash or special effects flash, is desired. The orientation of mirrors comprising MEMS mirror array 16 determine the direction of light exiting at a flash window 32 of telephone 30. For example, with the mirrors of MEMS array 16 aligned in a first state, the beams of light from source 14 may be redirected so as to all effectively be directed toward image target O, as shown in FIG. 3A. Likewise, with the mirrors of MEMS mirror array 16 aligned in a second state, only a portion of the light from source 14 is redirected to image target O, with a portion of the light directed away from the image target O and toward an image target O'.

Selectively directing of all or a portion of light from phone 30 toward an image target, or similarly away from an image target, may be automatically controlled by a software component operating within phone 30, may be manually controlled by the user of phone 30 through an appropriate interface, be the result of a selected image effect or user preference, or controlled by a combination of these methods. Test flashes may be performed in various configurations permitting analysis software components associated with phone 30 to analyze the response from the target scene. In response to the analysis, the software components may cause controller 20 (e.g., FIGS. 1A-1C) to actuate one or more of the mirrors of MEMS mirror array 16 to direct a first portion of the light from light source 14 to a first desired portion of the target scene (e.g., a greater amount of the light towards image target O) and a second portion of the light from light source 14 to a second desired portion of the target scene (e.g., a lesser amount of the light towards image target O'). It will be readily appreciated that direction of light may be exclusively towards one image target, away from one image target, diffused across the target scene, and so on.

Figure 4:
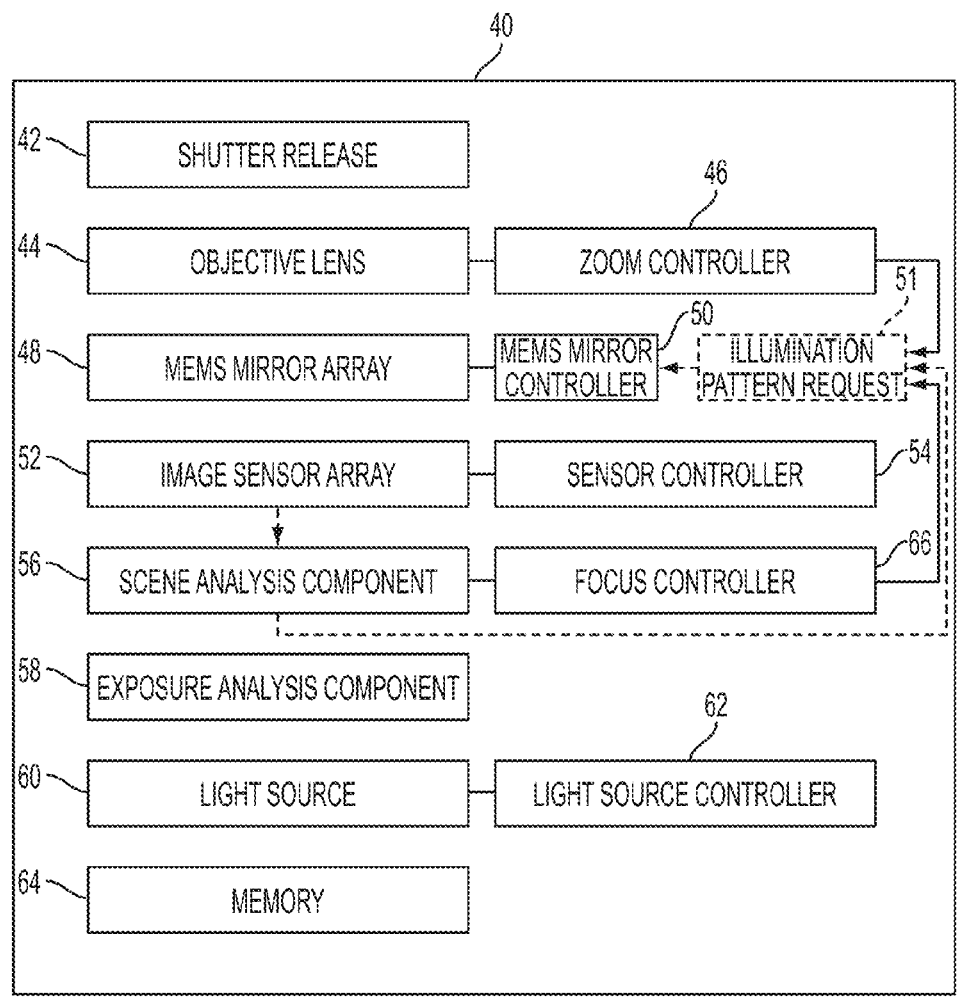
FIG. 4 is a block diagram illustrating certain elements of a compact camera according to one implementation of the present disclosure.

With reference to FIG. 4, which illustrates a block diagram of certain elements of a compact camera according to one implementation of the present disclosure, a compact camera 40 may include, inter alia: shutter release 42, an objective lens 44, a zoom controller 46 for controlling physical zoom of objective lens 44, MEMS mirror array 48, MEMS mirror array controller 50, image sensor array 52, image sensor array controller 54, scene analysis component 56, exposure analysis component 58, light source controller 62, memory 64, and focus controller 66. These elements may communicate with one another, as appropriate, to effectuate scene analysis and settings controls, including the control of illumination of the scene, to obtain a desired exposure. In particular, certain image capture components (including associated controllers) such as zoom controller 46 and focus controller 66 may be communicatively coupled to MEMS mirror controller 50 such that when an objective lens is zoomed (or a software equivalent is employed) to zoom in (or out) on an element of a scene the MEMS mirror controller correspondingly adjusts the positions of one or more mirrors of the MEMS mirror array 48, such as providing a more focused flash on the element of the scene being zoomed in upon. Similarly, when an element of a scene is identified as the object to be focused upon by focus controller 66, the focus setting may be communicated to the MEMS mirror controller 50 which may correspondingly adjust the positions of one or more mirrors of the MEMS mirror array 48, such as providing a more focused flash on the element of the scene being focused upon. As can be appreciated from the above, the input of many camera subsystems and controllers may desirably influence the optimal setting of the MEMS mirror array flash unit. To facilitate interchangeability (e.g., in the common setting of a flash units and cameras obtained from different suppliers), it may be beneficial to provide a separate controller to aggregate all the inputs into a "illumination pattern request" (IPR). This IPR—which could be as simple as a coarse greyscale bitmap—is then a hardware-independent description that can be submitted to any MEMS micro mirror array controller, which may have communicated its capabilities back to the camera before.

Figure 5A:
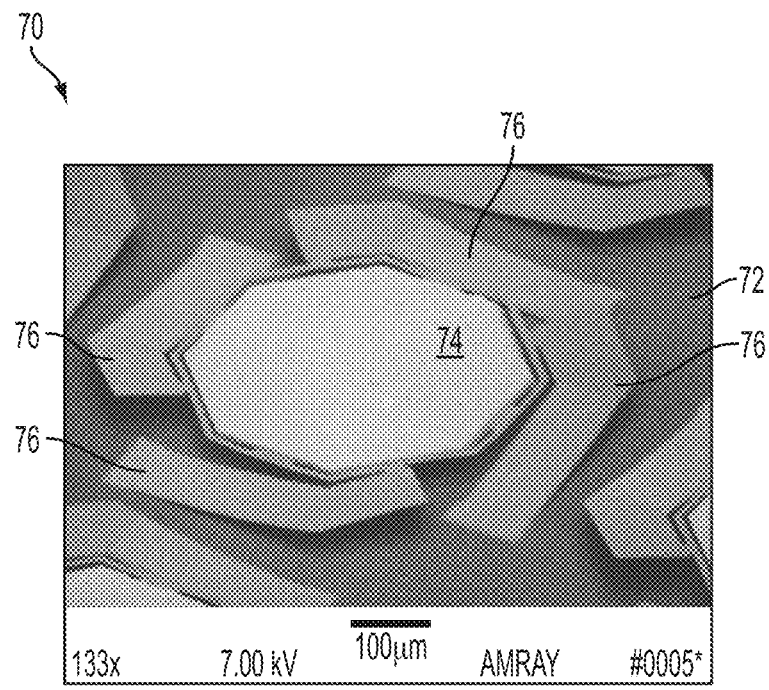
FIG. 5A is a perspective-view microphotograph of a MEMS mirror of a type which may form an element of a MEMS mirror array according to one implementation of the present disclosure.
Figure 5B:
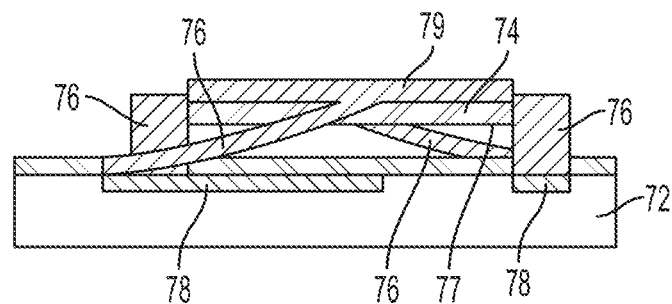
FIG. 5B is a side view illustration of a MEMS mirror of the type illustrated in FIG. 5A.

An example of a MEMS mirror 70 of a type which may form an element of a MEMS mirror array referred to above is shown in FIGS. 5A and 5B. In one implementation, mirror 70 comprises a substrate 72, such as glass or similar optically transparent material, over which is formed a release structure 74 interconnected to substrate 72 by way of flexible cantilever spring structures 76. In certain implementations, below each cantilever spring structure 76 is an actuation electrode 78, which may be individually addressed. Applying a voltage, for example, to an actuation electrode 78 may cause a field to be generated such that the cantilever spring structure 76 located thereover is attracted to electrode 78 thereby inducing tilt into the position of the mirror. In another implementation, such as illustrated in FIG. 1A, each mirror (or group of mirrors) is formed from or to include a magnetic surface, such as nickel. Each mirror has associated with it a magnetic actuator, which, when activated, attracts or deflects a portion of the mirror to thereby induce mirror tilt.

Figure 6:
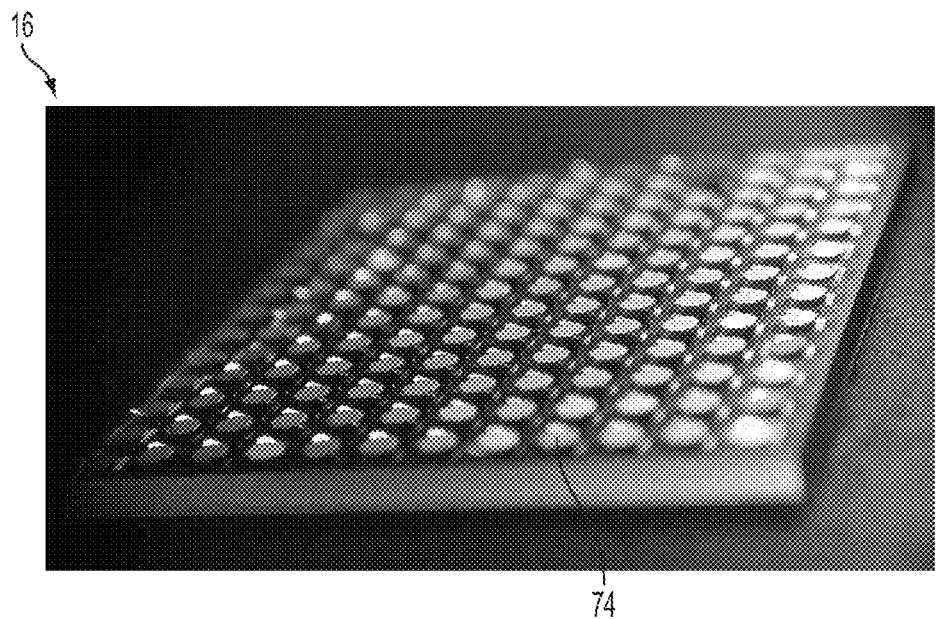
FIG. 6 is a perspective-view microphotograph of a MEMS mirror array of a type that may be utilized in one implementation of the present disclosure.

In certain implementations, release structure 74 is formed of an optically transparent material, and a reflective coating 79 (which may be the aforementioned nickel layer) is applied thereover such that the surface 77 of release structure 74 opposite and facing substrate 72 is optically reflective. In another embodiment, the entirety of release structure 74 is of an optically reflective material such that surface 77 may reflect light striking it from through substrate 72. An array 16 of individual release structures 74 forming MEMS mirrors is shown in FIG. 6. While FIG. 6 illustrates a 12×12 array, other array sizes are contemplated as may be determined by the specific application of the present disclosure.

Figure 7:
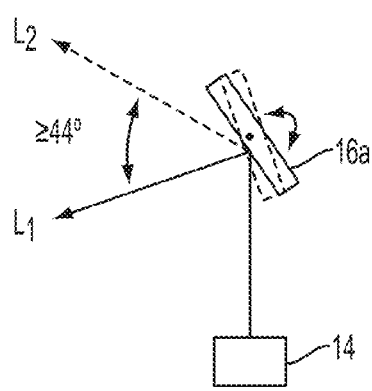
FIG. 7 is an illustration of mirror rotation of a MEMS mirror of a type that may be utilized in one implementation of the present disclosure.

MEMS mirrors such as mirror 16a of array 16 may be disposed on cantilever spring structures 76 to permit 2-axis control. The mechanical angular range of motion of each mirror of array 16 may be as wide as 45 degrees total, and in certain implementations at least +/−11 degrees in each axis for an optical deflection range of at least +/−22 degrees, as illustrated in FIG. 7. In this configuration, each mirror of array 16 serves a distinct zone of the angular field of view in the "all flat" state (i.e., with no mirror deflected from substantially parallel to substrate 72. When a targeted illumination is desired, each mirror of array 16 may be independently commissioned to direct light it reflects toward a desired region appropriate for the image (as determined, for example, by an image target, or facial detection algorithm) associated with controller 20 (FIG. 1A).

Figure 8A:
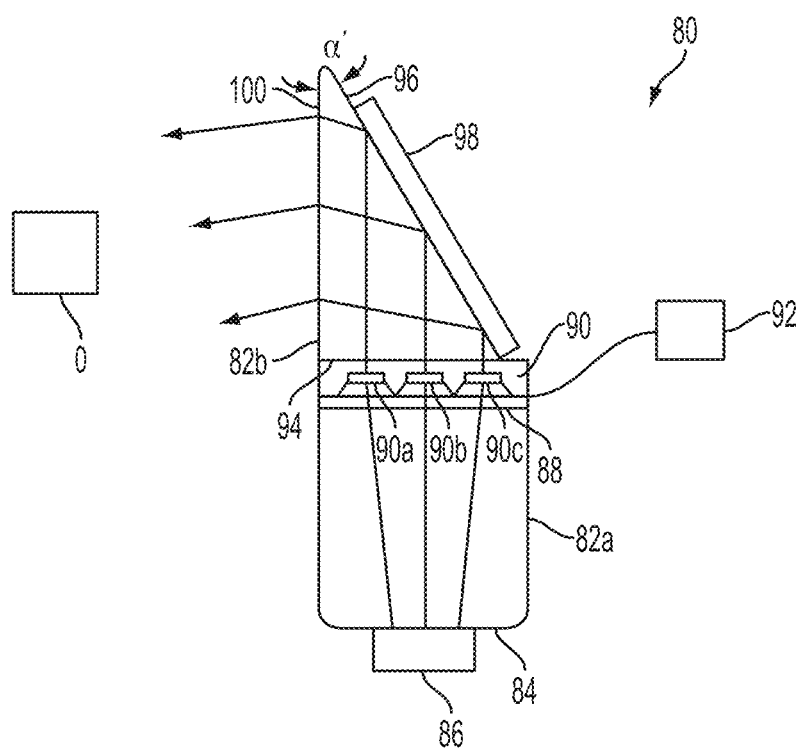
FIGS. 8A and 8B are sectional views of a transmissive steerable illumination structure such as may be used in a compact camera flash device and the like according to an embodiment of the present disclosure.
Figure 8B:
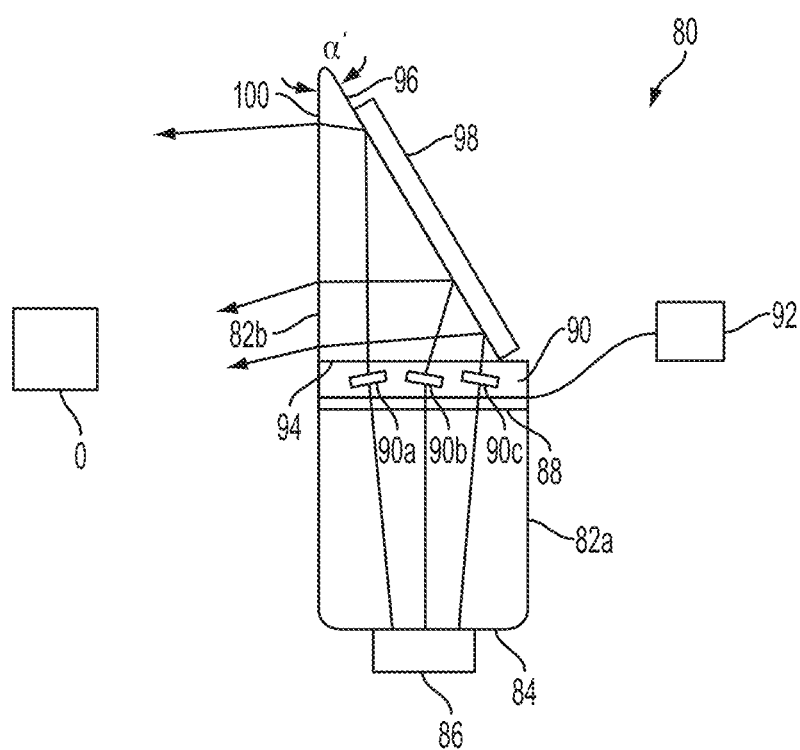

While the preceding discussion has focused on a reflective array for selectively directing light from a light source to or away from an image target, an alternative implementation 80 may comprise an array of transmissive lenses, as illustrated in FIGS. 8A and 8B. With reference to FIG. 8A, according to one implementation a two-part substrate comprises a first part 82a and a second part 82b. First part 82a has a first surface 84 proximate which is disposed a light source 86 such as an LED element, array of LED elements, or any other of a variety of other known forms of light source. In certain examples, multiple different light sources may be employed.

First part 82a also comprises a second surface 88 over which is disposed a MEMS lens array 90 that may be controlled by a controller 92. MEMS lens array 90 may be of a similar design to the MEMS mirror array previously discussed, and comprise individually addressable lenses 90a, 90b, 90c, and so on. Addressing of lenses 90a, 90b, 90c, may be by way of actuation electrodes (not shown, but as previously described with reference to FIG. 5B, for example), controlled by controller 92.

Second part 82b has a first surface 94 disposed proximate MEMS lens array 90. Second part 82b also has a second surface 96 over which is formed a reflective surface 98, such as a metal coating.

An optical system is thereby formed permitting light from source 86 to enter first part 82a, travel therethrough, exit first part 82a and travel through the lenses of MEMS lens array 90, which directs portions of the light into second part 82b. Light so directed is reflected by surface 98, toward a third surface 100 of second part 82b. Light may exit at third surface 100, and be selectively directed to or away from a on image target such as an object O in a scene to be photographed.

As previously described with reference to MEMS mirror array 16, MEMS lens array 90 may comprises an m×n array of independently addressable lenses, where m and n may be any appropriate number depending for example on the application of specific implementation of the present disclosure. In one implementation, m=n=5. In certain implementations, the lenses comprising MEMS lens array 90 may be addressable in groups, and in certain other implementations the lenses may be individually addressable. In certain implementations, the geometry of the optical system and stop-to-stop rotation of the lenses comprising MEMS lens array 90 are such that beam and exiting surface 100 may be controlled to +/−22.5 degrees, or a total sweep angle of up to 45 degrees. Once again, when a targeted illumination is desired, each lens of MEMS lens array 90 may be independently commissioned to direct light toward a desired region appropriate for the image (as determined, for example, by an image target, or facial detection algorithm) associated with controller 92.

The disposition of lenses 90a, 90b, 90c, and the angle α of surface 96 relative to the plane of surface 100, permits light from source 86 to be directed by lenses 90a, 90b, 90c into second part 82b and toward surface 96, where the light is reflected to surface 100 and may exit second part 82b. The orientation of lenses 90a, 90b, 90c will determine aspects of the light exiting at surface 100, such as the amount of light and where the light is directed. For example, with mirrors 90a, 90b, 90c aligned in a first state, the beams of light from source 86 may be effectively collimated and/or directed toward a single image target, O, essentially as shown in FIG. 8A. Likewise, with mirrors 90a, 90b, 90c aligned in a second state, the beams of light from source 86 may be reflected such that only certain beams are directed to image target, O, while certain other beams are directed away from the image target O, as illustrated in FIG. 8B.

Figure 9:
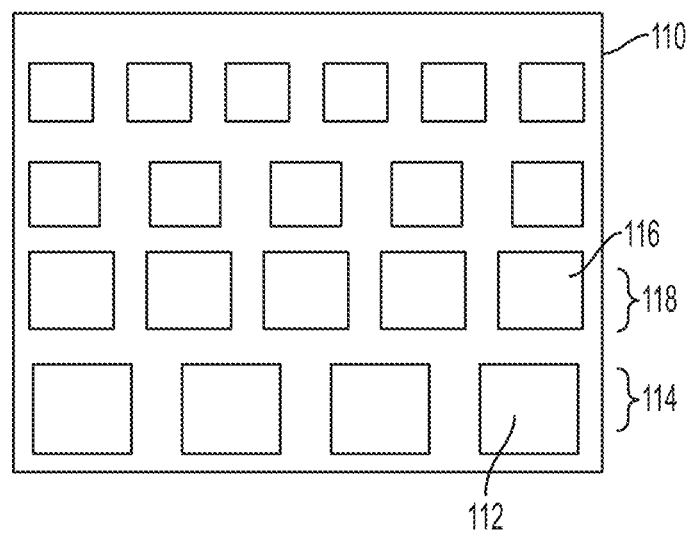
FIG. 9 is an illustration of a MEMS mirror array having non-uniform mirror-to-mirror spacing, mirror sizes, and mirror shapes according to an embodiment of the present disclosure.
Figure 10:
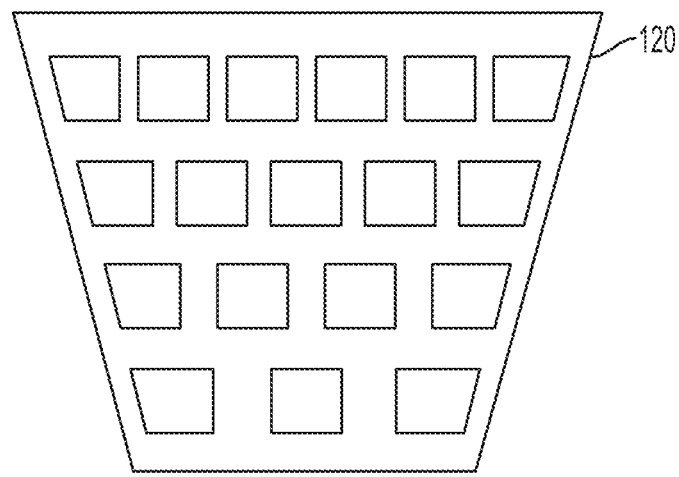
FIG. 10 is a non-rectangular MEMS mirror array according to an embodiment of the present disclosure.

In certain implementations of the present disclosure, the array of MEMS mirrors (or lenses) may be tailored to provide desired illumination patterns as light exits the flash system disclosed herein. For example, in one implementation illustrated in FIG. 9, the mirror-to-mirror spacing, mirror sizes, and mirror shapes of a MEMS mirror array 110 are selected so as to provide a desired fill factor of the exiting light. By way of example only, certain mirrors 112 in a first row 114 are larger and spaced further apart than other mirrors 116 in a second row 118. While the mirrors of array 110 are all shown as being substantially rectangular, the intra-array mirror shapes may also differ, such as some rectangular, others trapezoidal, still others hexagonal, and so on. In another implementation, illustrated in FIG. 10, the shape of the array 120 itself may be other than rectangular, such as trapezoidal as shown, again with the possibility of similar or different shapes, sizes, and spacing of the individual mirrors comprising the array. And, while the above has been in terms of mirror arrays, similar considerations and design choices may also apply to lens arrays.

Figure 11A:
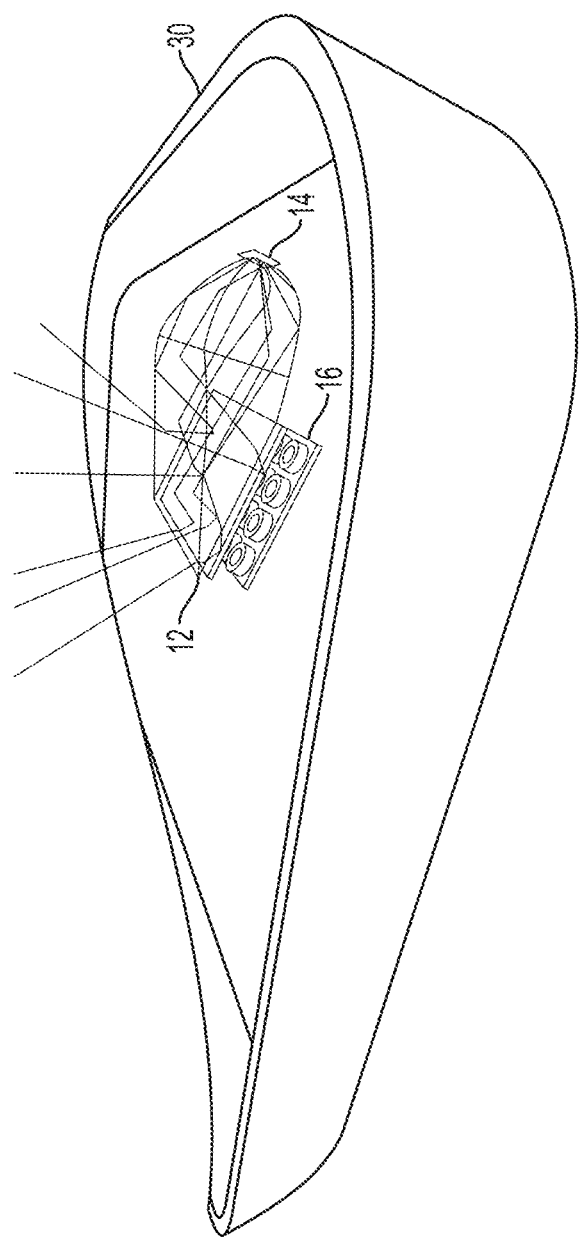
FIGS. 11A and 11B are perspective cut-away views of a mobile device having reflective steerable illumination structure disposed there according to an embodiment of the present disclosure, including ray tracings illustrating two states of light output.
Figure 11B:
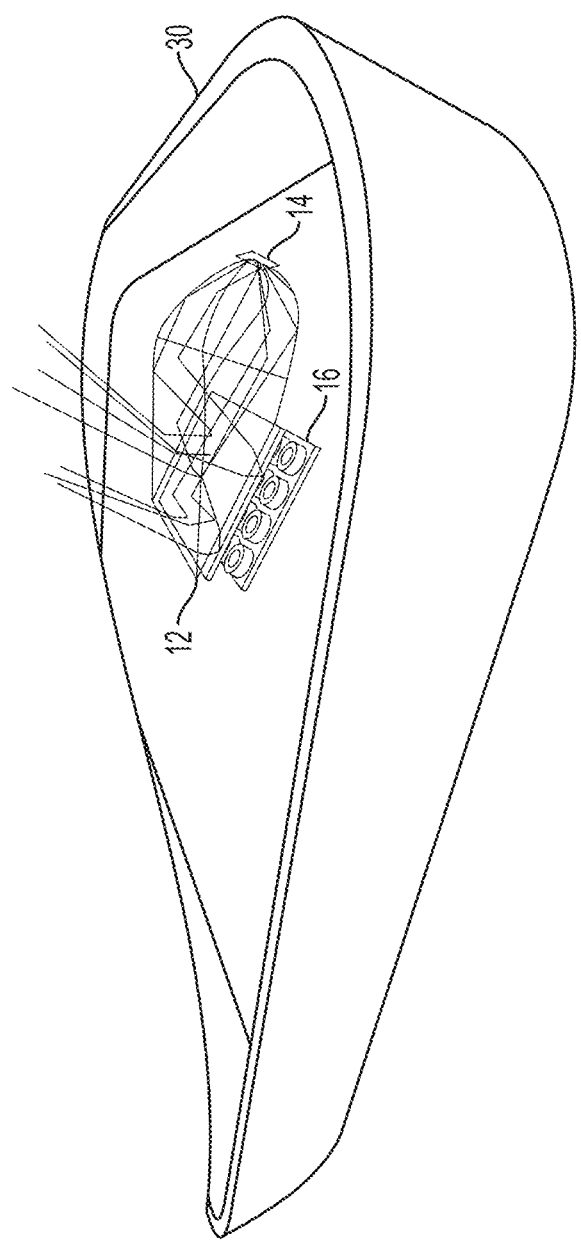

As previously mentioned, the steerable illumination structure disclosed herein may find particular application when forming the flash unit for cameras and the like disposed in mobile devices such as cellular telephones. This is further illustrated in FIGS. 11A and 11B, which are cutaway perspective views of a cellular telephone having a steerable illumination structure disposed therein. FIGS. 11A and 11B show ray tracings illustrating two different illumination patters, dispersed and focused, respectively.

It should be understood that when a first layer or structure is referred to as being "on" or "over" a second layer or structure, it can be directly on the second layer or structure, or on an intervening layer or layers, or structure or structures, between the first and second layers or structures, respectively. Further, when a first layer or structure is referred to as being "on" or "over" a second layer or structure, the first layer or structure may cover the entire second layer or structure or merely a portion thereof.

The physics of modern electrical devices and the methods of their production are not absolutes, but rather statistical efforts to produce a desired device and/or result. Even with the utmost of attention being paid to repeatability of processes, the nature of starting and processing materials, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. An optical compact illumination system comprising:
   a two-part substrate comprising a first and second part;
   wherein the first part comprises:
   a first surface proximate which is disposed a light source for issuing a light beam; and
   a second surface over which is disposed an array comprising a plurality of addressable reflectors, each continuously steerable within at least one degree of freedom, disposed such that said light beam is incident upon said array, wherein each said reflector is configured for redirecting a different portion of said light beam into a desired non-convergent light path, wherein said array of addressable reflectors comprises a plurality of rows, each said row comprises a plurality of addressable reflectors, a first of said rows having addressable reflectors of a first physical dimension or a first shape and a second of said rows having addressable reflectors of a second physical dimension or a second shape, the first physical dimension and the second physical dimension being different and the first shape and the second shape being different;
   wherein the second part comprises:
   a first surface disposed proximate the array;
   a second surface over which is formed a reflective surface, and wherein each said addressable reflector is a lens disposed such that a portion of the light from said light source may be independently directed thereby so as to be incident upon said reflective surface; and a third surface of the second part through which the portion of the light incident upon said reflective surface is selectively directed to or away from a target in a scene to be photographed.

2. The system of claim 1, wherein each said plurality of addressable reflectors are independently addressable.

3. The system of claim 1, wherein said light source is disposed to emit light substantially along a first axis, and further wherein said addressable reflectors are disposed such that light from said light source is reflected along a path that is rotated between 45 degrees and 135 degrees out of said first axis.

4. The system of claim 1, further comprising a magnetic actuator array, wherein each said addressable reflector may be actuated by said magnetic actuator array.

5. The system of claim 4, wherein each said addressable reflector has a corresponding magnetic actuator in said magnetic actuator array.

6. The system of claim 1, further comprising a plurality of electrodes associated with each said addressable reflector such that each said addressable reflector may be independently positioned by electrostatic actuation of at least one of said electrodes.

7. The system of claim 1, wherein said array of addressable reflectors comprises a plurality of rows, each said row comprises a plurality of said addressable reflectors, a first of said rows having a first number of addressable reflectors and a second of said rows having a second number of addressable reflectors, the first number and the second number being different.

8. An optical subsystem for providing a steerable-beam light source, comprising:
a two-part substrate comprising a first and second part;
wherein the first part comprises:
an optically transparent substrate;
a first surface proximate which is disposed a light source for directing light generated thereby into said optically transparent substrate; and
a second surface over which is disposed an array comprising a plurality of independently addressable optical elements disposed such that light from said light source received through said transparent substrate is incident upon said array, each said independently addressable optical element capable of independently redirecting a portion of said light from said light source into a desired light path; and
wherein the second part comprises:
a first surface disposed proximate the array;
a second surface over which is formed a reflector disposed proximate said transparent substrate, and wherein each said independently addressable optical element is a lens disposed such that a portion of the light from said light source may be independently directed thereby so as to be incident upon said reflector; and
a third surface of the second part through which the portion of the light incident upon said reflector is selectively directed to or away from a target in a scene to be photographed.

9. The subsystem of claim 8, wherein each said independently addressable optical element is a mirror.

10. The subsystem of claim 8, wherein said light source is disposed to emit light substantially along a first axis, and further wherein said independently addressable optical elements are disposed such that light from said light source is reflected into a path that is rotated between 45 degrees and 135 degrees out of said first axis.

11. The subsystem of claim 10, wherein at least a first portion of said light is reflected by at least a first of said elements and at least a second portion of said light is reflected by at least a second of said elements.

12. The subsystem of claim 8, wherein said light source is disposed to emit light substantially along a first axis, and further wherein said independently addressable optical elements are disposed such that light from said light source is collimated around a second axis that is not parallel to said first axis.

13. The subsystem of claim 8, further comprising a magnetic actuator array, wherein each said independently addressable optical element may be actuated by said magnetic actuator array.

14. The subsystem of claim 13, wherein each said independently addressable optical element has a corresponding magnetic actuator in said magnetic actuator array.

15. The subsystem of claim 8, further comprising a plurality of electrodes associated with each said independently addressable optical element such that each said independently addressable optical element may be independently positioned by electrostatic actuation of at least one of said electrodes.

16. The subsystem of claim 8, wherein said array comprises a plurality of rows, each said row comprises a plurality of said optical elements, a first of said rows having a first number of optical elements and a second of said rows having a second number of optical elements, the first number and the second number being different.

17. The subsystem of claim 8, wherein said array comprises a plurality of rows, each said row comprises a plurality of said optical elements, a first of said rows having optical elements of a first dimension and a second of said rows having optical elements of a second dimension, the first dimension and the second dimension being different.

18. The subsystem of claim 8, wherein said array comprises a plurality of rows, each said row comprises a plurality of said optical elements, a first of said rows having optical elements of a first shape and a second of said rows having optical elements of a second shape, the first shape and the second shape being different.

19. The subsystem of claim 8, further comprising:
an actuator array, whereby said independently addressable optical elements may be actuated by said actuator array;
an array controller, communicatively coupled to said actuator array, for controlling actuation of said independently addressable optical elements;
an image controller for controlling selection of an element of a scene for image capture; and
wherein said array controller is communicatively coupled to said image controller such that a selection of an element by said image controller produces a corresponding actuation of said independently addressable optical elements to selectively illuminate said selected element of said scene.

20. A compact camera including a flash system, comprising:
a steerable illumination housing;
an image capture subsystem disposed within said steerable illumination housing, said image capture subsystem capable of selectively focusing a light beam on one or more targets of a scene for an image capture operation;
wherein the steerable illumination housing comprises:
a light source disposed within said steerable illumination housing;

an optical element for total internal reflection of a light from the light source, wherein the optical element has a first surface proximate the light source;

an array proximate to a second surface of the optical element comprising a plurality of addressable reflectors, each reflector continuously steerable within at least two degrees of freedom, carried by said steerable illumination housing and disposed such that said light beam is incident upon said array, wherein each said reflector is configured for redirecting a different portion of said light beam through a substrate that exists between the second surface and the array into a desired light path of the optical element so as to exit said steerable illumination housing at a third surface and selectively directed toward or away from each of said one or more targets; and wherein the second surface and third surface are oriented at an angle relative to one another.

21. The compact camera of claim 20, wherein said compact camera forms a portion of a device selected from the group consisting of: a cellular telephone, a tablet computer, a laptop computer, a digital still-image camera, and a digital video-image camera.

22. The subsystem of claim 20, wherein each said reflector may independently redirect a portion of said light from said light source into a desired light path such that each said light path is directed to a selected one of said targets.

23. The subsystem of claim 20, further comprising:

an actuator array, whereby said reflector may be actuated by said actuator array;

an array controller, communicatively coupled to said actuator array, for controlling actuation of said reflectors;

an image controller for controlling selection of an element of a scene for image capture by said image capture subsystem; and wherein said array controller is communicatively coupled to said image controller such that a selection of an element by said image controller produces a corresponding actuation of said reflectors to selectively illuminate said selected element of said scene.

* * * * *